United States Patent
Statham

(10) Patent No.: US 10,354,414 B2
(45) Date of Patent: Jul. 16, 2019

(54) MATERIAL IDENTIFICATION USING MULTIPLE IMAGES

(75) Inventor: Peter John Statham, High Wycombe (GB)

(73) Assignee: Oxford Instruments Nanotehnology Tools Limited, Oxon (GB)

( * ) Notice: Subject to any disclaimer, the term of this patent is extended or adjusted under 35 U.S.C. 154(b) by 927 days.

(21) Appl. No.: 13/985,787

(22) PCT Filed: Jun. 6, 2011

(86) PCT No.: PCT/GB2011/051060
§ 371 (c)(1),
(2), (4) Date: Oct. 23, 2013

(87) PCT Pub. No.: WO2012/110754
PCT Pub. Date: Aug. 23, 2012

(65) Prior Publication Data
US 2014/0035943 A1    Feb. 6, 2014

(30) Foreign Application Priority Data
Feb. 15, 2011   (GB) .................................. 1102614.3

(51) Int. Cl.
*G06T 11/00* (2006.01)

(52) U.S. Cl.
CPC .................................. *G06T 11/001* (2013.01)

(58) Field of Classification Search
CPC ....... G06T 9/005; G06T 11/001; G06T 11/00; G06T 2207/10088; G06T 2207/10116;
(Continued)

(56) References Cited

U.S. PATENT DOCUMENTS

| 5,357,110 A | 10/1994 | Statham |
| 5,596,195 A | 1/1997 | Obori et al. |

(Continued)

OTHER PUBLICATIONS

Koschan A., Mongi A: Pseudocoloring in Single-Energy X-Ray Images; Chapter 13; "Digital Colour Image Processing"; 2008, John Wiley & Sons, Inc., pp. 339-372.
(Continued)

*Primary Examiner* — Sultana M Zalalee
(74) *Attorney, Agent, or Firm* — Blank Rome LLP

(57) ABSTRACT

A computer-implemented method of image processing for materials analysis is provided. At least three image datasets are obtained, these representing intensity values of image pixels and being in common spatial registration. The image datasets are processed so as to assign a comparison measure to each pair of image datasets, the comparison measure for a given pair of image datasets being representative of the difference between the spatial intensity information within the pair. A number of image datasets are then selected using the comparison measures. A color difference measure is defined which represents the difference between pairs of colors of a color set. Colors are assigned to the selected image datasets such that pairs of the selected image datasets which have substantially different spatial intensity information are assigned respective colors which have a substantially different color difference measure. A number of the selected image datasets are then combined together to form an output color image dataset for the formation of a color image. The combination is such that each pixel of the color image takes on a color according to the relative intensities and colors of the selected image datasets so that if the pixel intensity of one dataset is substantially greater than the sum of the pixel intensities for all the other selected datasets, then the output color in the respective part of the image will substantially match the color assigned to that image dataset.

21 Claims, 5 Drawing Sheets

(58) Field of Classification Search
CPC ............. G06T 5/50; G06T 2207/20192; G06T 2207/20224; G06T 7/11; G06K 9/4652; G06K 9/48; G06K 2009/366; G06K 2209/053; G06K 9/6212; G06K 9/6224; G01K 13/002; G06Q 50/22; G06F 19/321; G01B 11/30; G01B 11/303; A61F 13/15772; G01J 3/462; H04N 1/6033
USPC ......................................................... 345/593
See application file for complete search history.

(56) References Cited

U.S. PATENT DOCUMENTS

| | | | | |
|---|---|---|---|---|
| 5,805,170 | A * | 9/1998 | Burch | G06T 11/00 345/441 |
| 6,584,413 | B1 * | 6/2003 | Keenan | G01J 3/28 702/194 |
| 7,202,475 | B1 * | 4/2007 | Testoni | G01N 23/2252 250/307 |
| 2001/0021263 | A1 * | 9/2001 | Oosawa | G06T 5/50 382/132 |
| 2004/0022453 | A1 * | 2/2004 | Kusama | G06F 17/3025 382/284 |
| 2005/0043614 | A1 * | 2/2005 | Huizenga | A61B 5/055 600/427 |
| 2005/0190983 | A1 * | 9/2005 | Odogba | A61B 6/585 382/254 |
| 2006/0291619 | A1 * | 12/2006 | Statham | G01N 23/22 378/45 |
| 2008/0027676 | A1 * | 1/2008 | Statham | G01J 3/28 702/179 |
| 2008/0046217 | A1 * | 2/2008 | Polonskiy | G01J 3/28 702/179 |
| 2008/0051648 | A1 * | 2/2008 | Suri | A61B 6/481 600/407 |
| 2008/0292194 | A1 * | 11/2008 | Schmidt | G06T 7/0012 382/217 |
| 2009/0175526 | A1 * | 7/2009 | Ramsay | G06K 9/6224 382/132 |
| 2010/0119037 | A1 * | 5/2010 | Kato | G01N 23/10 378/53 |
| 2010/0259263 | A1 * | 10/2010 | Holland | A61B 5/055 324/310 |
| 2011/0012916 | A1 * | 1/2011 | Nelson | G01J 3/02 345/593 |

OTHER PUBLICATIONS

Robertson, P K., et al. "The Application of Perceptual Color Spaces to the Display of Remotely Sensed Imagery", IEEE Transactions on Geoscience and Remote Sensing, IEEE Service Center, Piscataway, NJ; vol. 26, No. 1, Jan. 1, 1988, pp. 49-59.

* cited by examiner

MATERIAL IDENTIFICATION USING MULTIPLE IMAGES

This present application is a national stage of PCT/GB2011/051060, filed Jun. 6, 2011, which claims benefit of GB 1102614.3, filed Feb. 15, 2011, the entire disclosures of which are hereby incorporated by reference in their entirety into the present disclosure.

FIELD OF THE INVENTION

The present invention relates to methods for material identification using multiple images, for example in the generation of multiple colour images in order to assist a user in understanding image data. The invention includes unsupervised methods for taking data from multiple signal sources and displaying a single visual image that reveals regions with different material composition.

BACKGROUND TO THE INVENTION

There exists a well-established technique for acquiring digital X-ray images using a scanning electron microscope (SEM) and one or more X-ray detectors. This technique involves directing an electron beam sequentially over a grid of points on a specimen surface. At each grid point, measurements are made at a specific X-ray energy with a so-called "wavelength dispersive spectrometer" (WDS), or an X-ray energy spectrum is acquired and data are extracted from this spectrum for selected chemical elements of interest using an energy dispersive spectrometer (EDS). In the simplest case, these data consist of, say, N integrals of counts recorded in energy bands (or "windows") surrounding the characteristic energy for each element of concern. When the full energy spectrum is available, more sophisticated techniques have been used to extract the area of each characteristic peak above background and correct for peak overlap and hence obtain the characteristic line intensity for the element of interest. Each data value is used as the "pixel" intensity at that grid point for the element of concern so, after scanning over all the grid points covering the field of view, a set of N digital images corresponding to the N chemical elements of interest is obtained.

These images are commonly referred to as "X-ray maps". These are commonly displayed using a computer monitor using a separate colour or hue for each element. For example, the "silicon" map could be displayed in blue, the "iron" map in red, the "potassium" map in green, and the "calcium" map in yellow. See for example P. J. Statham and M. Jones "Elemental Mapping Using Digital Storage and Colour Display", Scanning Vol. 3, 3 (1980) pp 169-171.

Images have also been combined by processing to show where certain elements co-exist in regions of a specimen. That is, once the original X-ray map data have been acquired, the images are inspected and then recombined in suitable combinations to reveal the distribution of phases in the specimen (where each phase consists of elements occurring in specific abundances and exhibits a colour distinct from other phases). See for example Statham and Jones, 1980 where Si (Blue), K (Yellow) and Fe(Red) maps are combined so that where two elements coexist and are above a threshold, a combination colour is shown (such as Blue+Yellow=Green, etc.) and where all three elements are present, white is displayed.

Information presented in this way has to be obtained by skilled operators who can select the right colours and manipulate the N digital images in a suitable manner.

In addition to the above technique that uses WDS or EDS for detection using an SEM for excitation, images representing some aspect of material content can also be produced by a variety of other sensors and excitation sources, for example: X-ray fluorescence (XRF), Electron Energy Loss spectroscopy (EELS), Particle Induced X-ray Emission (PIXE), Auger Electron Spectroscopy (AES), gamma-ray spectroscopy, Secondary Ion Mass Spectroscopy (SIMS), X-Ray Photoelectron Spectroscopy (XPS), Raman Spectroscopy, Magnetic Resonance Imaging (MRI), IR reflectometry and IR spectroscopy.

The collection of N images is sometimes referred to as a "multi-spectral" set of images and there is often a requirement to generate a single composite image that will highlight the location of different materials within a field of view. In some cases, more than one modality will be available so that signals from more than one sensor type can be obtained for a particular pixel position on the object so that in general the "multi-spectral" set could contain images from different modalities.

In the current context, a "multi-spectral" set of images is not the same as a "hyper-spectral" data set where, at each pixel, a series of contiguous channels of data are obtained that defines a full spectrum at each pixel. However, the "multi-spectral" and "hyper-spectral" data are obviously related because each spectrum in a "hyper-spectral" data set can be processed to generate one or more values which can be used as intensities for a "multi-spectral" set of images. For example, a full x-ray energy spectrum consisting of, say, 1024 channels of digital data for a single pixel could be processed to obtain the 4 intensities corresponding to characteristic x-ray lines for Si K, Fe K, K K and Ca K so that the full hyper-spectral "spectrum image" is converted to a multi-spectral set consisting of Si, Fe, K and Ca element maps. Each image in a multi-spectral set usually identifies the spatial distribution of a particular property such as the concentration of a particular element, the mean atomic number of the material or a particular wavelength of cathodoluminescence radiation and so on, so that each image in a multi-spectral set already conveys some information to the observer.

It is well known that colour images can be obtained by mixing images corresponding to the three primary colours: red, green and blue (R, G, B) (see for example, John J. Friel and Charles E. Lyman, "X-ray Mapping in Electron-Beam Instruments", Microsc. Microanal. 12, 2-25, 2006, FIG. 14). If the intensity value at a particular pixel in one image is Xr, in a second image is Xg and in the third image is Xb, then the tuple (Xr, Xg, Xb) can be used to define the colour at the corresponding pixel in a single full colour image. If the first image represents the concentration of one chemical element and the other images represent concentrations of other elements, then if the first image is shown in red alongside the resultant full colour image, in regions where the first image has the dominant pixel intensity, the resultant image will also be red in appearance. Thus even though there will be regions of mixed colour, there is some intuitive correspondence between the original images and the resultant full colour image, In general, if N is 3 or less, a single full colour image can be constructed simply by assigning one of the primary components, R, G or B to each original image.

If N>3, it is not possible to combine all the images in this fundamental way because there are only 3 independent channels for a typical RGB colour display. However one strategy for generating a single colour image that shows material content is to manipulate the data in the N images in order to obtain 3 suitable images that can be encoded in R, G and B and then mix these three images to expose mixture colours at each pixel that will delineate material content. This approach is sometimes called colour image fusion and the aim is to maximise the information content in the resultant full colour image. To this end, multivariate statistical techniques such a principal component analysis (PCA) are often employed to generate the images corresponding to the first 3 principal components. Each of the three principal component images is assigned to R, G and B to form the final full colour image. This approach has been described and assessed in detail (see for example, V. Tsagaris and V. Anastassopoulos, International Journal of Remote Sensing, Vol. 26, No. 15, 10 Aug. 2005, 3241-3254).

In the case where the original N images correspond to chemical element distribution maps (for example element maps in EDS/SEM or maps for particular mass numbers in SIMS), the original maps are easy to interpret. However, when multivariate statistical approaches are used to extract components, each derived component image is a mathematical abstraction that does not necessarily bear any direct relationship to any of the original N images.

An improved approach is described in Kotula et al, Microsc. Microanal. 9, 1-17, 2003, where a method using multivariate statistical analysis (MSA) is described to analyse a hyperspectral data set where the abstract principal components are converted into physically meaningful "pure" components and thus colour component images. Selected component images are coloured and mixed or "fused" to form a resultant image that bears a direct relationship to the component images. However, there is no attempt to provide a visual connection between the resultant image and the distribution of individual chemical elements that would normally be shown as a series of x-ray elemental maps. FIG. 1 summarises this prior art and shows that there is no direct connection between the construction of x-ray elemental maps and the visualisation of components derived by MSA. A hyper-spectral data set is used to construct x-ray maps. Separately, multivariate statistical analysis is applied to the hyper-spectral data to generate component images which are then "fused" to generate a resultant colour image showing regions of different composition. Although this method generates a resultant colour image using MSA, the colour is not connected to the colours chosen for the x-ray maps.

When N>3, a simple approach is to assign a distinctive individual colour to each original image then sum all the colour contributions from all the images at each pixel. For each image the signal intensity at each pixel is used to modulate the r, g, b components while maintaining the same colour hue. For the resultant mixture image, the r, g and b values from all the individually-coloured original images are summed to obtain a single r, g, b value for every pixel position. If necessary, the resultant mixture image can be scaled so that none of the r, g or b values exceeds the maximum allowed by the display technology used. This approach works well when there is very little overlap between the bright pixels in the original images because in regions where one original image dominates, the same colour will appear in the resultant image. However, if several of the original images are similar in appearance, in pixels where these images dominate over the others, the resultant pixel colour will not correspond to any one of the original images so the correspondence between original image and resultant image will be lost. Furthermore, as the number of original images, N, increases, the perceptible difference between the colours assigned to each original image decreases. Therefore, to get any success with this method, it is invariably necessary for an expert to select a suitable subset of original images for mixing and ignore the others.

There is therefore a need in materials analysis applications to provide an automated method of processing a number of different input image datasets to form a combined image dataset in such a way that regions of the input images which contribute significantly to corresponding region in the combined image have a recognisable colour similarity between the respective regions of the input and combined images.

SUMMARY OF THE INVENTION

According to a first aspect of the present invention, there is provided a computer-implemented method of image processing for materials analysis comprising performing the following set of steps automatically:— a) obtaining N image datasets, each dataset representing intensity values of image pixels, wherein the image pixels represented by the datasets are in a common spatial registration, and wherein N is an integer greater than 3;

b) processing the N image datasets so as to assign a comparison measure to each pair of image datasets, the comparison measure for a given pair of image datasets being representative of the difference between the spatial intensity information within one image dataset in comparison with the spatial intensity information within the other image dataset of the pair;

c) selecting a number of the image datasets based upon the comparison measures;

d) defining a colour difference measure which represents the difference between pairs of colours of a colour set;

e) assigning a colour to each of the selected image datasets such that pairs of the selected image datasets which have substantially different spatial intensity information between datasets within a respective pair, are assigned respective colours which have a substantially different colour difference measure; and, f) combining a number of the selected image datasets together to form an output colour image dataset for the formation of a colour image such that each pixel of the colour image takes on a colour according to the relative intensities and colours of the said number of selected image datasets so that if the pixel intensity of one dataset is substantially greater than the sum of the pixel intensities for all the other selected datasets, the output colour in the respective part of the image will substantially match the colour assigned in step (e) to that image dataset.

The invention enables an automatic and unsupervised method of assigning colours to a series of input "images" and of generating a single full colour "image" that retains the colour connection between an original input image and the resultant image in regions where the original input image has the dominant intensity over all other images. In the case where original images represent element content, the resultant colour image will show regions in different colour where the proportions of the elements are different. Thus, in the resultant image there will appear a series of regions in different colours where each colour is representative of a particular material. Furthermore, pixels where a particular element is dominant will have a similar colour to the original image for that element. Rather than use any predefined combination of images, the method is unsupervised and does not use any prior knowledge of the object being studied in that it works out a suitable colour scheme and a suitable mix of images using the information and statistical content of all the original input images.

While an expert may be able to achieve a similar aim with manual selection of colours and mixture, the aim of the invention is to achieve this on any assemblage of images by an automatic algorithm that requires no user intervention. The great advantage of this is that users no longer need to be experts in image processing in order to ensure they gain the full benefit of an output colour image with a beneficial colour scheme.

The benefit of the invention in practical terms derives from the ability to choose a suitable set of colours and for these to be applied to a suitable number of the datasets. The invention contemplates the assignment of a colour to each dataset in the sense that each dataset may be assigned a different colour. However, it is also contemplated that certain datasets may be assigned a common colour or that certain datasets are excluded from further consideration, during the method, for example once their similarity with each other dataset has been measured.

The step of selecting the datasets for inclusion can be thought of as an output or final part of the processing. The selecting includes the possibility that the number of image datasets selected is the same as those processed in which case the selecting may be merely the provision of the processed datasets to the next processing stage. In other cases the selecting includes the selection of a smaller number of image datasets from those processed. The processing typically results in additional data being evaluated which represents or describes the relationships between the datasets, this data including the comparison measure. Other selection steps are also contemplated, such as initially (before any other of the stated steps), or following the assignment of the colours for example.

The number of processed and selected datasets may be N in the same way as in the obtaining step. The initial number of datasets (prior to the obtaining step) for processing may therefore be N. However, a number of datasets in excess of N could be initially evaluated and then reduced to N prior to the obtaining step, it being recognised that the method benefits from a relatively small number of colours (such as 7 or fewer) since as the number of colours increases the greater the difficulty in maintaining the "visual" relationship between the output dataset and the component input datasets from which it is generated.

It is preferred that the number of assigned colours is less than a predetermined integer. Most preferably seven or fewer colours are assigned. The assigned colours are preferably selected in such a way as to provide maximum discernable visual difference to a human observer, such as a user of a computer system which implements the method. Preferably the colour difference measure used in the method is a function of angular colour hue.

There are a number of different possible ways in which to assign appropriate colours to the datasets. In one such method the sum of the spatial information content of the image datasets is calculated for ranges of angular hue to evaluate an angular density as a function of hue angle. As part of this method, each image dataset is typically normalised to the maximum intensity present whereby the intensity within each image dataset is weighted in accordance with the angular density prior to the intensities being summed to form the resultant output colour image dataset. Alternative methods for achieving a similar effect may also use a normalising approach, such as by normalising the intensities of the image datasets.

The processing step is typically achieved by considering a number of pair-wise comparisons between the datasets. A convenient manner in which this may be achieved as part of processing the image datasets is by using matrices. Typically the step of processing the image datasets includes calculating a matrix of numerical comparison measures for each image dataset pair. For example the comparison measure may be the sum of cross products of pixel intensities for the two images in a pair of image datasets under consideration. One benefit of such an approach is that the processing may further comprise evaluating whether the plurality of image datasets are substantially collinear and, if they are, then removing one dataset in order to reduce the measure of collinearity. The mathematical analysis of collinearity between datasets provides an advantage to certain implementations. However, alternative approaches using statistical measures of the differences in intensity data between pairs of datasets and in which the comparison measure has a magnitude relating to these statistical measures, are also of great value. For example, the magnitude of the colour difference measure between the assigned colours for each pair of image datasets may be made a function of the magnitude of the comparison measure for the pair under such circumstances.

As mentioned above, in some implementations not all of the datasets are assigned different colours. For example, if a plurality of image datasets are evaluated as having sufficiently similar spatial intensity information, then either one of such datasets may be selected or a combined image dataset may be formed from the said plurality of image datasets for further processing. Such datasets may be removed as part of a collinearity calculation. The image datasets may also be processed in other ways, for example by evaluating the effect of noise within each image dataset. If this is performed at an early stage in the method then this allows for more efficient use of processing resources by removing from the method any image datasets in which the variation in intensity is not above a noise threshold.

The step of combining the selected image datasets may include the combining of each of the image datasets to which a colour has been assigned. Alternatively a smaller number of such image datasets may be selected for the combining step.

Having assigned the appropriate colours to the selected datasets, these preferably having appropriate Red, Green and Blue values, the method typically includes summing such values in the contributing datasets in order to form the output colour image dataset having corresponding Red, Green and Blue values. Whilst this approach uses the additive nature of primary colours, it may be preferred to use pixel intensity values of the output colour image dataset according to a subtractive colour model. Such a subtractive model has greater parallels with the mixing of paints and this may provide more intuitive mixtures of colours.

Another possible method of combining datasets which may be used as an alternative or addition to numerical combination of colour values is to apply the colours from different datasets in a small region of adjacent pixels. Therefore, when the output colour image dataset comprises individual pixel data from each image dataset, the pixels from the different image datasets may be placed in a spatial vicinity surrounding a location corresponding to the pixel location in each of the image datasets. This may be thought of as a type of "dithering".

The image datasets may be representative of a number of different types of spatial information, this being governed primarily by the physical technique used to acquire the data.

Typically however, each image dataset represents the distribution of a particular element or property of a material within a field of view of a corresponding image. Thus the datasets may represent "x-ray maps" of particular elements.

The datasets which are obtained during the initial obtaining step may be datasets which have been obtained directly from the respective apparatus used to acquire the images. They may however be generated by calculation. In the case where the apparatus produces a hyper-spectral dataset (effectively a continuous spectrum at each pixel), then the method may comprise processing the hyperspectral dataset so as to generate the N image datasets obtained in step (a).

Once the output colour image dataset has been produced typically it is then displayed. In order to gain the maximum benefit from the displayed output colour image dataset it is preferably displayed with one or more of the image datasets, a selected number of the image datasets or each of the image datasets. This allows a direct comparison between the image datasets of the output and the contributing "input" image datasets. Further benefit may be obtained by combining the displayed dataset with topographical data in greyscale so as to produce a displayed colour image containing topographical information. Additional techniques may also be applied such as applying image segmentation to the output colour image dataset to identify regions with substantially constant material composition.

The method according to the invention is suitable for use with data obtained using a number of techniques and corresponding analysis equipment. Such techniques include: wavelength dispersive spectroscopy, energy dispersive spectroscopy, x-ray fluorescence analysis, electron energy loss spectroscopy, particle induced x-ray emission (PIXE), auger electron spectroscopy (AES), gamma-ray spectroscopy, secondary ion mass spectroscopy (SIMS), x-ray photoelectron spectroscopy (XPS), raman spectroscopy, magnetic resonance imaging (MRI), infra red reflectometry, and infra red spectroscopy. Each of the above techniques is typically implemented using a computer and the images are displayed and manipulated upon an attached computer monitor. The method is preferably implemented upon such a computer system although the data may be transferred to one or more remote computer systems separate from the analysis equipment using an appropriate network, including the Internet. The invention therefore includes a computer program product comprising program code configured to perform the method when said program code is executed upon a suitable computer.

BRIEF DESCRIPTION OF THE DRAWINGS

Some examples of present invention will now be described, with reference to the accompanying drawings, in which.

DETAILED DESCRIPTION

We now describe some examples of the invention. For illustration purposes we refer mainly to the case where each original image represents the concentration of a particular chemical element at all pixel positions and is referred to as an "element map". However, the approach can also be applied to any collection of images that are in perfect registration so that the signals for the same pixel location in every image are associated with the same position in the real object field of view (i.e. a "multi-spectral" set of images as described above).

Figure 1:
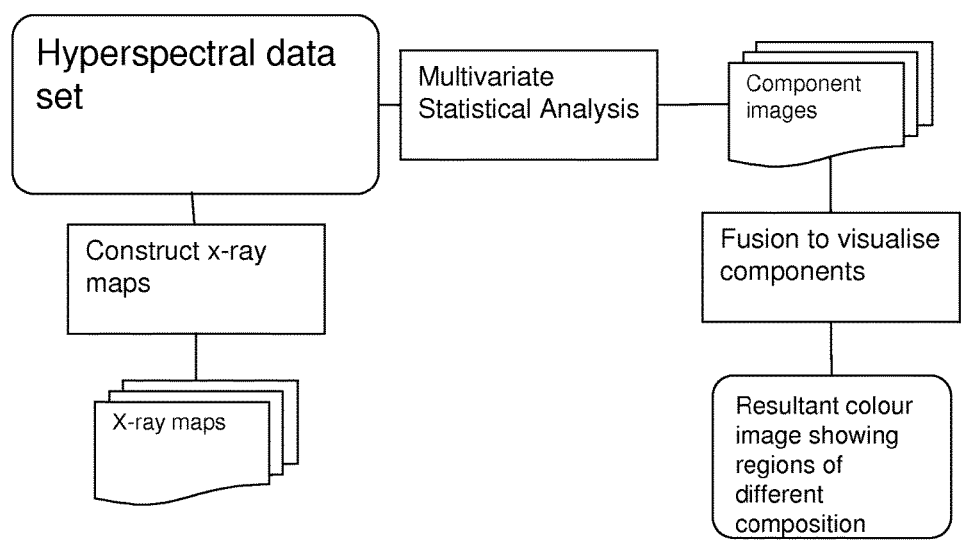
FIG. 1 shows a schematic illustration of a prior art method of generating resultant colour images using multivariate statistical analysis.
Figure 2:
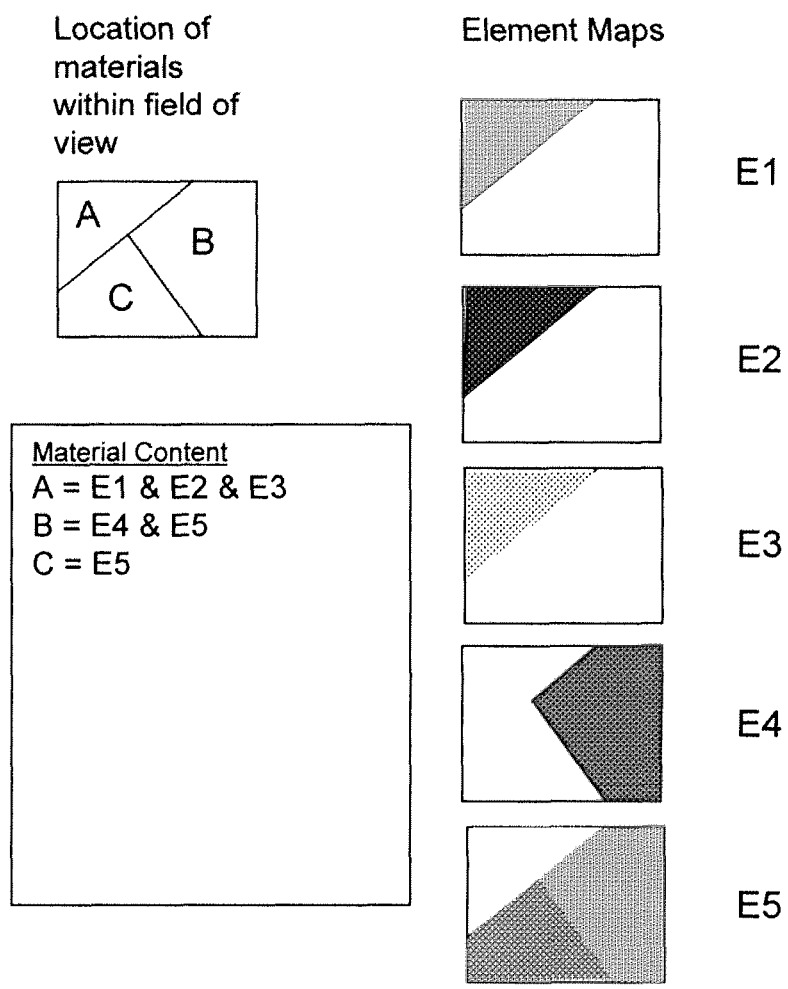
FIG. 2 illustrates the generation of an output image formed from elemental maps.

When a region for a particular material is in the "field of view" of an analysis system, it will contain certain elements in a fixed proportion. FIG. 2 shows an example field of view where three different materials, A, B and C are visible. Element maps are acquired for the elements E1, E2, E3, E4 and E5. These are also illustrated in FIG. 2. Since E1, E2 and E3 only occur within material A, the maps for E1, E2 and E3 are very similar in appearance but have an intensity which reflects the relative concentrations of the elements within material A. In this case the element E2 has a higher concentration than either E1 or E3. E4 is only present in material B so the map for E4 clearly delineates that material. E5 is present in both materials B and C and map E5 shows up both these materials and the intensities in the regions corresponding to B and C may or may not be different, depending on the relative content of E5 in the two materials. If the intensities are the same, then the boundary of B and C will not be obvious from E5 alone but will be obvious if both E4 and E5 are considered. In this case a slightly different concentration is present and so the boundary between the materials B and C is visible.

The element maps E1, E2 and E3 all give the same information about the location of materials. If the original images E1, E2 and E3 were colour-coded using different colours and the coloured images were then mixed together (e.g. by arithmetic combination), the resultant image would show a colour that was different from any of the original images and consequently there would not be a strong colour connection between the result and the original signal source. Therefore, one principle of the invention is to allocate a similar colour to maps of similar appearance so that in any arithmetic mixing, in regions where the set of similar original images are brighter than any others, the resultant colour will be similar to that used for these originals. It is clear that map E4 is different from the maps E1 to E3 and therefore a different colour is allocated to E4. Furthermore, E5 is different from all the other maps so a further colour is allocated to E5. Another principle of the invention is to allocate colours that are as different as possible from previously allocated colours so that regions in the resultant image are well delineated.

An image that has uniform intensity everywhere cannot reveal any regions of different composition. Therefore, another principle underlying many implementations of the invention is to prioritise the selection of images giving preference to those with higher spatial intensity variation. Each original image is likely to have added noise. For example, if the images are x-ray maps there will be a Poisson probability distribution of counts in each pixel so that there will be random fluctuations in count level from pixel to pixel even in regions where the material composition is not changing. If the intensity variations in the image are no bigger than the variations due to noise fluctuations, the image detail will be obscured by noise; such an image should be excluded because it will not add useful contrast to the resultant mixed image. Therefore, another principle providing advantage to the invention is to give preference to those images that have a higher spatial intensity variation relative to likely random noise fluctuations.

Thus, in one implementation of the invention, all original images that show similar spatial content are ascribed a similar colour, images with poor signal-to-noise are rejected and images with markedly different spatial content are given distinctly different colours. Preference is given to images with a larger degree of spatial intensity variation relative to expected random noise and the resultant image is formed by combining the suitably-coloured input images.

Various strategies are contemplated to allocate colours to the individual maps based on a measure of difference between spatial content of maps and a measure of difference between colours. Since hue can be represented as an angle between 0 and 360 degrees, one measure of colour difference is the difference in hue angles; given a measure $D(i,j)$ of the difference in spatial content of two images i and j, hues can be assigned according to this measure. For example, the maximum difference in this measure between any two images can be associated with a hue difference of 180 degrees. The two images with the maximum difference are assigned hue angles of 0 and 180 degrees on the colour circle. The remaining images are then allocated hue numbers in order to maximise the function:

$$\text{sum}(D(i,j) \times \text{abs}(\text{Hue}(i) - \text{Hue}(j)))$$

where $\text{abs}(\text{Hue}(i)-\text{Hue}(j))$ is the absolute difference between the hue numbers allocated to images i and j and the sum is over all pairs of images i and j. Once the hues have been allocated, the images are allocated a weight according to a measure of spatial information content relative to noise, $S(i)$ and then the sum of spatial information content over a fixed angular range is calculated to determine the angular density of spatial information content as a function of hue angle. After the images have been normalised to the same maximum intensity, each image is divided by this angular density before the images are summed to form the resultant image. Thus useful spatial information content is spread out over all the available colours in such a way to emphasise the difference in spatial distribution to delineate regions of different material composition. The combinatorial optimisation required for this type of approach soon becomes impractical when there are many input images because of the high numerical cost of computation. However, an alternative scheme that achieves the objectives of the invention and is practical to compute will now be described.

Given a set of N images, the images are ranked according to significant information content, taking into account expected levels of random noise. Images with signal to noise ratio below a certain threshold are excluded. The highest ranked image is assigned a colour code then tested for similarity with the other images of lower rank. If a lower ranked image is sufficiently similar, it is assigned the same colour code, otherwise no colour is assigned. The next colour code is assigned to the highest ranked image that has not already been assigned a colour, and the process is repeated until all the images have been assigned colour codes or if a prescribed maximum number of colours have been allocated.

There will in general be M colour codes assigned where M<=N. For these M colour codes, a separate hue is assigned where the hues are chosen to be as distinct as possible and are conveniently chosen to be evenly spaced, for example at a separation of 360/M degrees around the colour circle, although the colour separation could be chosen to maximise the colour contrast according to human visual response. The hues are then assigned to images and this assignment can be in an arbitrary order. However, some benefit can be gained by permuting the order so that images that show the biggest difference in spatial content are not allocated adjacent hues on the colour circle.

Each image is converted to a full colour image by using the pixel intensity values to modulate the r, g, b values that are in the ratios defined by the chosen hue. M images with different colours are selected for the mix. For images that have been allocated the same colour code, either the highest ranked image is chosen, or these can be combined (e.g. by weighted averaging) to provide a single image with that colour.

At each pixel, the r, g, b values from all of the M coloured images are summed to obtain the r, g, b value for the resultant image which is scaled if necessary to suit the system used for display of the image. The coloured resultant image that reveals material content may also be combined with a grey scale image that shows topography for example. Methods of summing colours and combining with a grey scale image are described for example by U.S. Pat. No. 5,357,110 (Statham, Visual Colour Mapping X-ray Analysis Apparatus) and follow the general principles of HSV (Hue, Saturation and Value) or HLS (Hue, Saturation and Lightness) colour compositing, where the intensity of the grey scale image is used to control either V or L. The definition of hue and the relationship between HSV, HLS and RGB colour models is well known, see for example Donald Hearn and M. Pauline Baker, "Computer Graphics", 1986, ISBN 0-13-165598-1, Prentice Hall International, chapter 14.

Since the resultant colour image has been assembled from coloured images that are all different in spatial content, if one of these images dominates the intensity in one region, the resultant colour will be the same as in the original element map. Thus the connection between original maps and the resultant colour map will be apparent and this is one desirable benefit of the method. Regions of different material composition will appear in different colours provided that the r, g, b sum of original image intensities and colours for one material are not identical to the sum for another material. Whereas it is important to include as many different element maps as possible in the mix, when more colours are allocated, the difference between colours will be less and there is increased likelihood of two different materials appearing in the same colour in the mix. Therefore, one approach to this problem is simply to limit the maximum number of colours that can be allocated.

The difference in material content may be caused by an element that is a minor constituent. Furthermore, the relationship between composition and intensity may be different for different elements. Therefore, it is beneficial to normalise the intensity of the chosen maps prior to mixing so that the maximum values all have the same intensity.

When element maps are derived from a hyper-spectral data set by using the integral over fixed energy windows in the spectrum at each pixel, it is possible for the element maps to be similar in appearance in the case where two characteristic element emission series overlap strongly. For example, the Ti K series and Ba L series emissions are in the same energy region so that for materials with a high Ti content, both the Ti element map and the Ba element map will show high intensity. Similarly, for materials with high Ba content, both the Ti and B maps will show high intensity. Thus, the Ti and Ba maps will be very similar in appearance and will not delineate regions that have different Ti or Ba concentration. When an element is present in low concentration, the integrated intensity in an energy window may be dominated by the background (bremsstrahlung) intensity. Since this background intensity may change for different materials, the map for this element will not necessarily be representative of the element content. Therefore, to improve the performance of the method, it is desirable for the original maps to be derived using more sophisticated techniques to extract the area of each characteristic peak above background and correct for peak overlap and thus obtain intensities that are representative of the element of interest.

When the original images are element maps it is important that maps are available for all the elements that are present in the materials that are in the field of view. In some applications the list of possible elements are known and maps can be acquired for all these elements. In the case of a completely unknown specimen, elements are typically detected by inspecting the sum spectrum which is the sum of spectra acquired from every pixel in the field of view (i.e. in the hyper-spectral data set). There are problems with this approach because if there is a small area of unique material within the field of view, the spectral content from this small area may be insignificant in the sum which is dominated by all the pixels that do not contain this material. This problem has been addressed in U.S. Pat. No. 7,533,000 (Statham and Penman, Method and Apparatus for Analysing a Dataset of Spectra) where the spectral energy bands that contribute to such small "nuggets" of unique material can be detected even though there is no peak obvious in the sum spectrum at this energy. Thus, it is desirable to use the techniques described in U.S. Pat. No. 7,533,000 to identify the peak energies, and thus elements that need to be mapped, so that these small "nuggets" will be visualised by the current method.

An alternative approach is to break the field of view down into a grid of sub-regions, sum the spectra for the pixels in each sub region, then inspect all these sub-region sum spectra and identify the elements present. Since the "nugget" of material will be much larger relative to the size of the sub region, the unique spectrum will no longer be dominated by the spectra from the remaining pixels so there is a higher probability for an element to be detected.

The resultant colour image allows the viewer to see the spatial location of different materials because different materials will appear in different colours. Although there will be some fluctuation in colour due to random noise, the viewer will perceive each region in an average colour representative of the material despite this additive noise. Automatic methods can be applied to delineate the regions and quantify how many different materials are present in the field of view. For example, image segmentation techniques such as clustering can be applied to the resultant RGB colour image. Alternatively, rather than use the r, g, b value of the resultant image, the combination of M intensities for the selected original images can be considered as a vector intensity at each pixel and subjected to image segmentation techniques. The selection of M maps from the N original maps reduces the redundancy in the information content and improves the success of these segmentation techniques. When the field of view has been segmented into different regions, if the original maps have been derived from a hyper-spectral data set, with a spectrum at every pixel, then the spectral data for all pixels within a region can be summed to obtain a spectrum that is representative of the material.

EMBODIMENTS OF THE INVENTION

To assess the information content and noise present in each image, various measures could be used such as image entropy and signal-to-noise estimates from autocorrelation. Following U.S. Pat. No. 7,533,000, for images like x-ray element maps where the pixel values are subject to a Poisson probability distribution of counts, one useful measure of the spatial variation relative to that expected due to statistics is:

$$chisq = \text{sum}\{(y - y\text{mean})^2 / y\text{mean}\}$$

where y is the count value in a pixel, ymean is the average pixel intensity over the whole image and the sum is over all image pixels. This measure will take the smallest value when the material is completely uniform over the field of view. As shown in U.S. Pat. No. 7,533,000, if the x-ray map is uniform over the whole field of view, the probability distribution of this sum can be predicted and if chisq falls below a threshold value, the image can be excluded because it does not demonstrate significant spatial variation.

When the maps have been prepared by processing full spectrum data at each pixel, then a statistical calculation is used to estimate the peak intensity and the variance of the result at each pixel (see for example "Deconvolution and background subtraction by least squares fitting with prefiltering of spectra", P J Statham, Anal. Chem. 49, 2149-2154, 1977). In that case an equivalent measure for spatial variation is:

$$chisq = \text{sum}\{(P - P\text{mean})^2 / \text{Var}P\}$$

where VarP is the average variance over all pixels, P is the intensity for the characteristic peak of interest and Pmean is the average intensity over all pixels.

To assess degree of similarity (or conversely, degree of difference) between images, various measures such as the normalised cross correlation coefficient and concepts such as mutual information and joint entropy have been used. The following is a practical measure of the difference between images X and Y when the pixel values are Poisson distributed counts:

$$chisq\text{diff}(X, Y) = \text{sum}\{(y/y\text{mean} - x/x\text{mean})^2 / (1/x\text{mean} + 1/y\text{mean})\}$$

where x and y are the count values for the same pixel in each image, xmean and ymean are the average count values for all pixels in each image and the sum is over all image pixels. If the images are the result of processing then the equivalent expression is:

$$chisq\text{diff}(X, Y) = \text{sum}\{(Py/Py\text{mean} - Px/Px\text{mean})^2 / (\text{Var}X/Px\text{mean}^2 + \text{Var}Y/Py\text{mean}^2)\}$$

where Px and Py are the intensities calculated at the same pixel location, Pxmean and Pymean are the mean intensities over all image pixels, VarX and VarY are the mean statistical variances over all image pixels and the sum is over all image pixels.

The smallest values for this measure occur when the underlying signal content for the images are identical apart from a scaling constant. In this case, the above measure has a probability distribution which is approximately that of a chi-square distribution with Npix degrees of freedom where Npix is the number of pixels in the image. Thus, a threshold can be set so that if this sum exceeds the threshold, the images are deemed to be significantly different.

These measures of image information content, chisq, and image difference, chisqdiff, are used in the algorithm described below to generate a resultant colour image and a selected set of coloured input images for display. In the resultant image, regions corresponding to different materials are likely to appear in different colours and when a material is dominated by the contribution from one element, the resultant image and the coloured input element map will appear in the same colour and establish the intuitive connection between element distribution and the location of materials.

In the simple example of FIG. 2, images E1, E2 and E3 would be assigned the same colour code because they are spatially similar and E2 would be selected as the best one to use for display because of the higher chisq. E4 and E5 would be assigned different colour codes so a total of 3 colour codes would be assigned and allocated hue angles of 0, 120 and 240 degrees. E1, E2 and E3 will then be coloured the same saturated colour while E4 and E5 will be coloured in different saturated colours while still retaining the intensity distribution. The resultant image will show coloured regions that correspond to the material distributions shown where A will take the same colour as images E1, E2 and E3, B will be a mix of colours from E4 and E5 and C will show the same colour as E5. Thus the colour connection between the original input data and the resultant image is established for all elements apart from E4.

When the method is used with a hyper-spectral data set with one spectrum at every pixel, to ensure that the input maps include all elements that might be present in any of the materials in the field of view, the methods described in U.S. Pat. No. 7,533,000 are used to detect the energy regions in the spectrum which are likely to generate maps with significant spatial variation. These energy regions are then used as a basis to identify the elements that have line series corresponding to these energy regions. Furthermore, the method can be improved by processing each spectrum to deal with peak overlaps and background subtraction as described in P J Statham, Anal. Chem. 49, 2149-2154, 1977 because this reduces the redundancy in the set of element map images.

Figure 3:
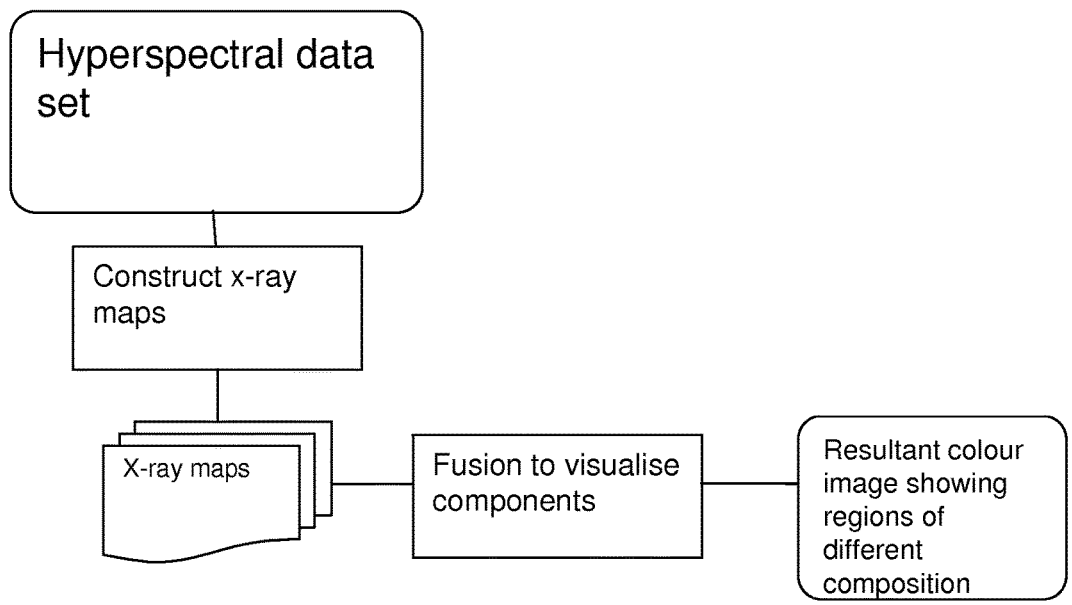
FIG. 3 shows a general method according to examples of the invention.

The overall summary of the approach is shown in FIG. 3 where, after generating element maps from a hyper-spectral data set by well-established methods, the new method of fusion is used to generate a resultant image that displays material content information in colour and retains the colour connection with the x-ray element maps that are familiar to users.

A suitable algorithm to generate single resultant image from a collection of input element maps is as follows ("Pair-wise fusion algorithm"):—
1) Assign maximum number of colours to NCOL
2) Assign significant information threshold value to Tsig
3) Assign significant difference threshold value to Tdiff
4) Eliminate maps where chisq<Tsig
5) Sort remaining N maps in descending order of chisq
6) Set colour codes for all maps to "NONE"
7) Set colour number, ICOL=0
8) For each map I from 1 to N ---
If colour code of map I is "NONE"
then
   ICOL = ICOL + 1
   set colour code of map I = ICOL
   For J = I+1 to N
     If colour code of map j is "NONE" and chisqdiff( I , J ) < Tdiff
     then set colour code of map J = ICOL
   Next J
   If ICOL = NCOL finish and go to (9)
Next I

---

9) Select one map for each colour code e.g. the map with highest chisq value
10) Assign HUE values around the colour circle (for example HUE(i)=360×(i−1)/ICOL for i=1 to ICOL, S=1, V=1)
11) Permute order of maps to minimise sum{chisqdiff (I, I+1} over all adjacent maps (including chisqdiff (ICOL, 1) because the colours will be cyclic)
12) Scale all maps to the same maximum intensity of 1, (use assigned HUE, S=1, V=Intensity to obtain HSV colour at each pixel and convert to RGB coloured images, one for each hue).
13) At each pixel, calculate result pixel by summing product of intensity×rgb colour for all selected maps and assigned colours
14) Scale resultant rgb image for display or combine with grey scale image using HSV or HLS compositing
15) Display resultant coloured image and the input maps in their assigned hues An alternative fusion approach to that set out above is now described, this adopting a more mathematically "pure" approach which includes a technique for handling "collinearity" between datasets.

In the known technique of component analysis of a hyperspectral data set (described elsewhere) with m pixels and n contiguous channels of data at each pixel, the aim is to approximate the data set by a factorisation into matrices of component images and spectral components:

$$D \cong AS^T$$

where A(m×p) is a set of component images and S(n×p) is a set of component spectra. The goal is to minimise the number of components p needed to provide an adequate representation of the real information content of D. Because of rotational ambiguity, there are an infinite number of factor pairs A and S that provide an identical fit to the data and additional criteria need to be introduced to choose the most appropriate pair (see M. R. Keenan, 2007, Chapter 5 in "Techniques and Applications of Hyperspectral Image Analysis", Wiley & Sons, ISBN 978-0-470-01086-0). In conventional principal component analysis (PCA), the factorisation requires the columns of A to be mutually orthogonal and the columns of S to be orthonormal. Whereas this gives a method of representing the data, the orthogonality constraints produce a set of component images and spectra that include negative values and these components are not physically plausible and are difficult to interpret. Alternative approaches impose the more realistic constraint of non-negativity so that each component spectrum now looks like the spectrum from a real material and the relative abundance of this component is shown in the corresponding component image (e.g. U.S. Pat. No. 6,584,413). However, although such component spectra are seemingly realistic and easier to understand, they are still a mathematical abstraction. For example, using such an approach with a non-negativity constraint, in the paper referred to earlier, Kotula et al (2003, Microsc. Microanal. 9, 1-17), obtain a composite colour image by mixing four component images using red, blue, green and cyan colours (see FIG. 10 of the reference). A real particle containing FeCo would normally exhibit a spectrum with FeK, FeL, CoK and CoL lines present. However, in FIG. 11 of Kotula et al 2003, the multivariate statistical factorisation produced two component spectra, one with FeK and CoK lines and the other with FeL and CoL lines. Neither of these component spectra are realistic and it took the expertise of the authors to resolve this practical inconsistency by deciding to combine the two component images into one blue image representing the distribution of "FeCo".

Figure 4:
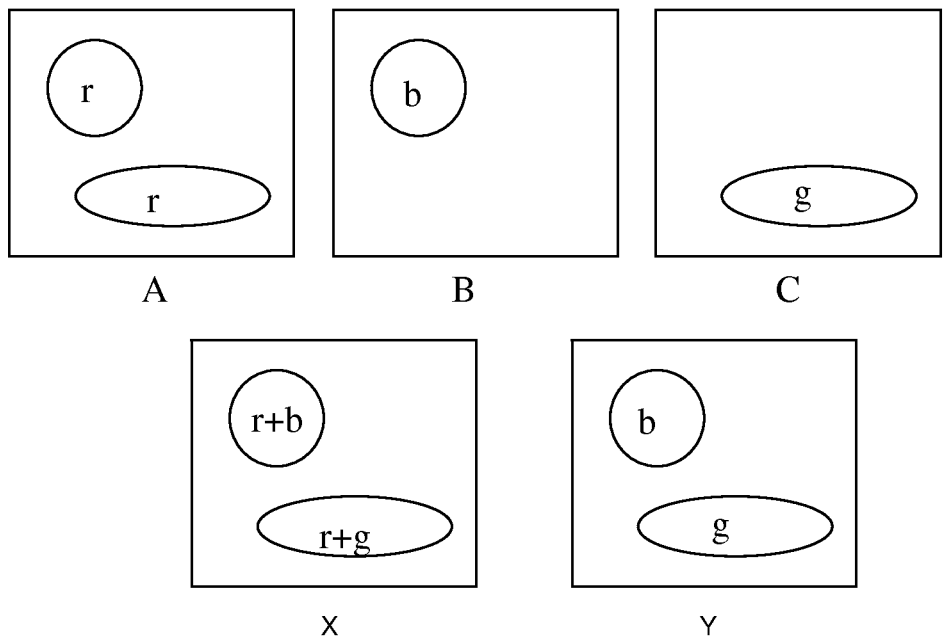
FIG. 4 illustrates the practical effect of collinear image datasets.

As has been explained, the current invention takes a different approach and starts with a set of images that can be interpreted in isolation. The aim is to select an appropriate set of factors and colours to use for mixing the real images so that composite colours in the mixture image are likely to show the location of different materials. Since each real image will be associated with a particular colour, the relationship between the input images and the resulting composite image will also be intuitive. Images that are too noisy can be excluded explicitly or by using a factor of zero. If one input image happens to be close to a linear combination of one or more other images, these other images are redundant in that they do not add any more spatial information to help delineate different materials. Furthermore, if different colours were used for these other images in a composite mix, the mixture colour would no longer match any one of the input images so the colour connection between input image and output composite would be lost. Thus it is useful to be able to identify this "collinearity" in terms of the mathematical relationship between the image datasets. FIG. 4 shows the implications of collinearity.

In FIG. 4 a set of 3 input images are shown where image A can be expressed as the sum of B and C. Thus, A, B, C are collinear in the mathematical sense although no two images are similar (this distinction being important when comparing with "Pair-wise fusion algorithm"). If all three images are used in a colour mix, the resulting image X shows two regions, one with colour r+b, the other with colour r+g. Although these two regions are different in colour, the colour does not coincide with any of the three input images so the connection between input and output colour is reduced or potentially lost. Furthermore, by using three colours and not gaining any new information about material distribution, we have "wasted" a colour. If the collinearity is recognised and one of these images, for example, A, is excluded, then the two regions in the result Y have colours b and g which are still the same as in the original input images. Therefore, an automatic colouring algorithm will work better if it is possible to recognise collinearity and eliminate images that do not add unique additional information to discriminate between different regions.

Referring again to the method described in association with FIG. 3 above ("Pair-wise fusion algorithm") this checks that no two images are similar but does not look for any higher order collinearity. However, such collinearity can be tested by matrix algebraic methods. The present embodiment utilises such a method, providing "fusion with collinearity management".

If there are n image datasets and m pixels in the field of view, the m pixel×n image matrix of data can be broken down by singular value decomposition (SVD) into the product of three matrices:

$$D=UWV^T$$

U is an m×n, V is n×n and W is an n×n diagonal matrix and superscript T signifies the transpose of a matrix (see Numerical Recipes, Cambridge University Press, 1986, ISBN 0-521-30811-9). The diagonal elements of W are the singular values which are the square root of the eigenvalues of $D^TD$ and the ratio of the maximum to minimum singular value is the "condition number" for the matrix. Redundant information in the set of input images will appear as linear dependence between two or more columns of D. If the images were noise free, then such linear dependence would cause at least one of the singular values to be zero and consequently the condition number would be infinite. In practice, each image is likely to have some level of noise so the condition number is never infinite. If the noise level is predictable, appropriate statistical weighting can be applied to the rows and columns of D so that there is greater separation of eigenvalues representing systematic and random noise contributions to the data (see for example Keenan, 2007).

If we consider the inverse of the condition number, "ICN", then a higher value of ICN is desirable and indicates that the D matrix does not have any redundant information.

Although SVD can be used, when m pixels>>n images, it is more efficient to form the cross product $D^TD$ and do the eigenvalue decomposition to find the eigenvalues that are the square of the corresponding singular values for D (for example see U.S. Pat. No. 6,584,413). The cross product $D^TD$ is a form of cross correlation and the matrix values depend on the differences or conversely the similarities between each pair of images.

Thus, we can express the task as finding a subset of n images from the original N image datasets that gives an acceptably high ICN. If we set a suitable minimum threshold for ICN, then we can test whether the set of N input images contains at least N images which are not collinear. If ICN is too small, then we need to eliminate at least one image to remove some of the redundant information. Various methods could be used to eliminate redundant images (see for example Bandyopadhyay et al, 2005, Int. J. Numer. Model, 18, 413-427) but the following algorithm shows one method for achieving an optimal set with a high ICN.

Fusion with Collinearity Management Algorithm

1) Starting with n=N image datasets, construct m-pixel×n matrix D and apply statistical weighting if appropriate
2) Perform the eigenvalue decomposition of $D^TD$ and calculate the inverse condition number (ICN) for the m×n matrix D.
3) If ICN<Threshold or n>NCOL (maximum number of colours), then
    eliminate each one of the input datasets in turn and form an m×(n−1) matrix thus finding which dataset to eliminate to give an m×(n−1) matrix with the highest ICN and
    eliminate that dataset, set n=n−1 and retain the highest ICN number
4) Repeat operation (3), and eliminate another dataset if necessary.
5) Finally colours are assigned to the M remaining image datasets, using hues equally spaced around the colour circle and these are used for the resultant colour mix.

Figure 5:
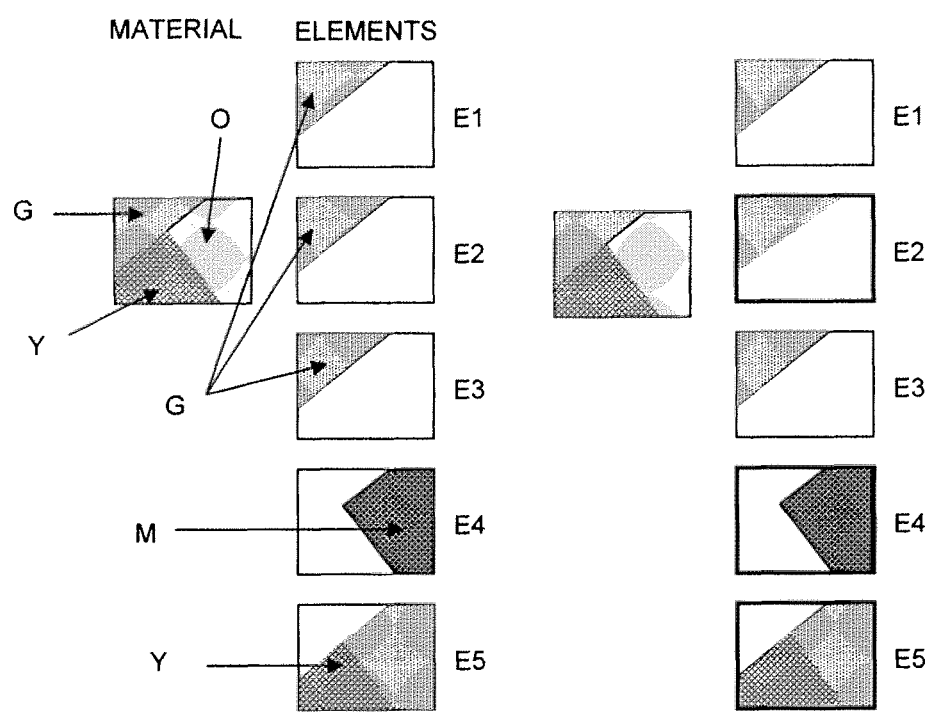
FIG. 5 shows various possible schematic representations of output images and their associated input images.
Figure 5:
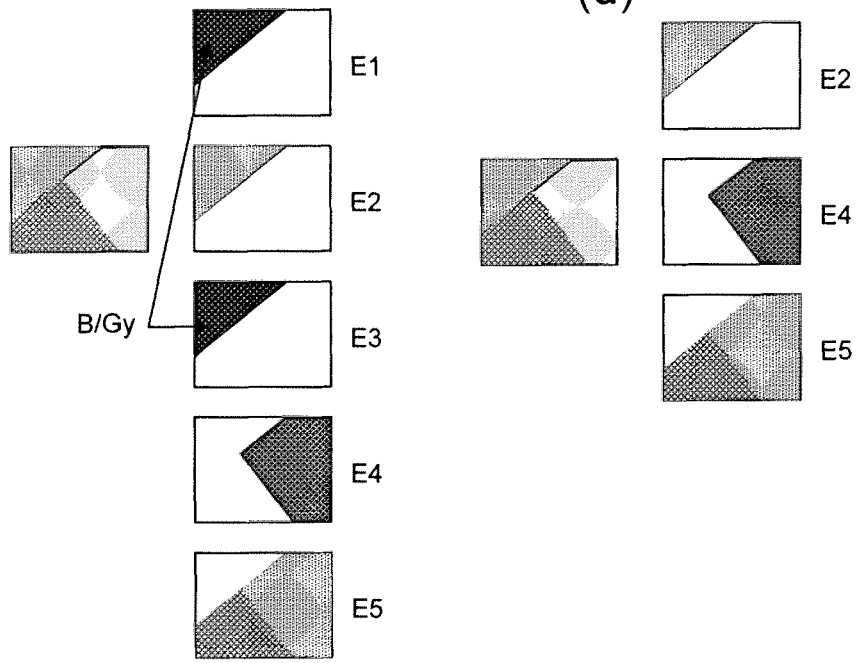

Whilst two different algorithmic approaches have been described in terms of "pair-wise fusion" and "fusion with collinearity management" algorithms, fundamentally each accords to the following automated procedure:
(a) generate the colour map showing materials; and
(b) use a computer-implemented colour mixing method that retains the connection between the element maps and the coloured output image A number of possible practical implementations of the invention in terms of a displayed output, are illustrated in FIG. 5 (from left to right as denoted by (a) to (d)):—
(a) This is similar to the situation in FIG. 2, where an output colour image is shown with regions A, B, C in colours Green (G), Orange (O) and Yellow (Y) respectively. The component images E1, E2, E3 are shown in similar but not identical shades of green and images E4 and E5 are in different colours (Magenta and Yellow respectively). Note that the output colour image and "input" (component) images do not necessarily have to be visible at the same time (b) As in (a), but only images E2, E4, E5 are used in the algorithm. This is denoted by these images being tagged or highlighted on the display in an appropriate manner (shown by using a box for example).
(c) As in (a) but only image E2 has been coloured green. Note that images E1 and E2 are still displayed and could be coloured grey which still makes the invention useful, and may be coloured in a "neutral" blue for example.
(d) As in (c) but only image E2 is actually displayed with E4 and E5.

In FIG. 5 the colours are denoted by: G (Green), O (Orange), Y (Yellow), M (Magenta), B/Gy (Blue or Greyscale). Colours in equivalent positions in (b) to (d) in comparison with (a) are similar to those in (a) unless stated otherwise. Note that Orange denotes a mixture of yellow and magenta.

A further display mode for the output colour image dataset is to "fuse" it with a greyscale image that is from the same field of view. The greyscale image might show topography for example.

When establishing the colour connection between the input image and resultant image, it is useful to be able to identify the regions where one element dominates the composition of the material (and is in the same colour). It would be advantageous if it were easy to deduce from the resultant colour, in regions where two element concentrations are strong, which two element colours contributed to that mixture colour. This can be achieved as is now discussed.

When colour images are combined by addition and scaling, as implied in the description, this is essentially an "additive" colour model where the primaries are R, G and B and colours are added to give greater intensity. In an additive colour model, Red+Green gives a result of Yellow for example, where the yellow is brighter than red or green on its own, which is not what happens when paints are mixed for example. Paint mixing conforms to a "subtractive" colour model, where colours are "removed" from light. Therefore, a more intuitive notion of mixing colours is to treat the coloured input images as if they were "paints" and combine them using a subtractive colour model. This makes no difference to the colour when one intensity is much greater than the others but the mixtures seem more intuitive (e.g. magenta(pink)+yellow=orange, as in FIG. 5).

Therefore, an important embodiment is the generation of an output colour image that is generated by a subtractive colour mixing of the coloured input images. In this case, the input images are coloured so that they are white wherever the pixel intensity is zero and saturated colour when the pixel intensity is a maximum. The output colour image pixel still takes the same colour as the input image when that input image pixel has a much stronger intensity than all other images, but when more than one input image pixel is has a significant intensity, the output colour is equivalent to the result of superimposing colour filters on top of a light box.

Yet another variant that has been proposed for achieving this "paint like" mixing, is to present a series of pixels, one from each input image, close together. If the positions are randomised by dithering, then the overall effect is that of a subtractive paint mix.

There are therefore a wide range of possibilities for combining colours into a resultant image. The simplest is an additive colour model where the r, g, b components of colours are summed and the result is scaled to be in range of the display. A more complicated model is the "subtractive" colour model (CMY . . . see Donald Hearn and M. Pauline Baker, "Computer Graphics", 1986, ISBN 0-13-165598-1, Prentice Hall International, chapter 14.) that more closely resembles the rules for mixing inks and can be more intuitive. "Subtractive" colour should really be implemented as a multiplication operation because it corresponds to colour being absorbed rather than added. Each image can then be represented as a series of layers and if each layer represented a sheet of transparent acetate with a coloured image painted on the layer, the resultant image can be calculated to correspond with what would be observed if white light, or a grey scale image, were viewed through the superimposed acetate layers. Other more sophisticated models have been proposed to provide an intuitive colour mixing effect e.g. http://web.siat.ac.cn/~baoquan/papers/InfoVis-_Paint.pdf). The key requirement for whatever mixing method is used is that if the original pixel intensity in one of the input images dominates (i.e. is greater than the sum of all the intensities of the other input images at this pixel), then the resultant colour should be similar to that of this input image.

The invention claimed is:

1. A computer-implemented method of image processing for materials analysis comprising performing the following set of steps automatically:
    a) obtaining N image datasets, each dataset representing intensity values of image pixels, wherein the image pixels represented by the datasets represent signal measurement positions on the same object that are in a common spatial registration, and wherein N is an integer greater than 3;
    b) processing the N image datasets representing the image pixels that are in common spatial registration so as to assign a numerical comparison measure to each pair of image datasets, the numerical comparison measure for a given pair of image datasets being representative of the difference between the spatial intensity distribution within one image dataset in comparison with the spatial intensity distribution within the other image dataset of the pair;
    c) selecting a number of the image datasets based upon the numerical comparison measures between image pixels that are in common spatial registration;
    d) defining a colour difference measure which represents the difference between pairs of colours of a colour set;
    e) assigning a colour to each of the selected image datasets such that pairs of the selected image datasets which have substantially different spatial intensity distribution between datasets within a respective pair based on the numerical comparison measure of step (b), are assigned respective colours which have a substantially different colour difference measure; and,
    f) combining a number of the selected image datasets together to form an output colour image dataset for the formation of a colour image such that each pixel of the colour image takes on a colour according to the relative intensities and colours of the said number of selected image datasets so that if the pixel intensity of one dataset is substantially greater than the sum of the pixel intensities for all the other selected datasets, the output colour in the respective part of the image will substantially match the colour assigned in step (e) to that image dataset.

2. A method according to claim 1, wherein the number of assigned colours is less than a predetermined integer.

3. A method according to claim 1, wherein the colour difference measure is a function of angular colour hue.

4. A method according to claim 3, wherein the sum of the spatial information content of the image datasets is calculated for ranges of angular hue to evaluate an angular density as a function of hue angle, wherein each image dataset is normalised to the maximum intensity present and wherein the intensity within each image dataset is weighted in accordance with the angular density prior to the intensities being summed to form the resultant output colour image dataset.

5. A method according to claim 1, wherein the step of processing the image datasets includes calculating a matrix of numerical comparison measures for each image dataset pair.

6. A method according to claim 5, wherein the numerical comparison measure is the sum of cross products of pixel intensities for the two images in a pair.

7. A method according to claim 5, further comprising, evaluating whether the plurality of image datasets are substantially collinear and, if they are, then removing one dataset in order to reduce the measure of collinearity.

8. A method according to claim 5, wherein the magnitude of the colour difference measure between the assigned colours for each pair of image datasets is a function of the magnitude of the numerical comparison measure for the said pair.

9. A method according to claim 1, wherein, if a plurality of image datasets are evaluated as having sufficiently similar spatial intensity distribution, then either one of such datasets is selected or a combined image dataset is formed from the said plurality of image datasets for further processing.

10. A method according to claim 1, further comprising, evaluating the effect of noise within each image dataset.

11. A method according to claim 9, further comprising initially removing from the method any image datasets in which the variation in intensity is not above a noise threshold.

12. A method according to claim 1, wherein the output colour image dataset comprises Red, Green and Blue values, the said values being the sum of corresponding component Red, Green and Blue values in each image dataset.

13. A method according to claim 1, wherein the pixel intensity values of the output colour image dataset are set according to a subtractive colour model.

14. A method according to claim 1, wherein the output colour image dataset comprises individual pixel data from each image dataset, the pixels from the different image datasets being placed in a spatial vicinity surrounding a location corresponding to the pixel location in each of the image datasets.

15. A method according to claim 1, wherein each image dataset represents the distribution of a particular element or property of a material within a field of view of a corresponding image.

16. A method according to claim 1, further comprising, obtaining a hyperspectral dataset and processing the hyperspectral dataset so as to generate the N image datasets obtained in step (a).

17. A method according to claim 1, further comprising displaying one or more of the output colour image dataset, a selected number of the image datasets or each of the image datasets.

18. A method according to claim 17, further comprising combining the displayed dataset with topographical data in greyscale so as to produce a displayed colour image containing topographical information.

19. A method according to claim 1, further comprising, applying image segmentation to the output colour image dataset to identify regions with substantially constant material composition.

20. A method according to claim 1, wherein the image datasets are image datasets originating from analysis equipment which performs a method selected from the group of: wavelength dispersive spectroscopy, energy dispersive spectroscopy, x-ray fluorescence analysis, electron energy loss spectroscopy, particle induced x-ray emission (PUCE), auger electron spectroscopy (AES), gamma-ray spectroscopy, secondary ion mass spectroscopy (SIMS), x-ray photoelectron spectroscopy (XPS), raman spectroscopy, magnetic resonance imaging (MRI), infra red reflectometry, infra red spectroscopy.

21. A non-transitory computer-readable medium encoded with a computer program comprising program code configured to perform the method according to claim 1, when said program code is executed upon a computer.

* * * * *